(12) United States Patent
Singh (10) Patent No.: US 9,915,189 B2
(45) Date of Patent: Mar. 13, 2018

(54) MULTIPOINT IGNITION SYSTEMS AND METHODS

(71) Applicant: Caterpillar Inc., Peoria, IL (US)

(72) Inventor: Jaswinder Singh, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 174 days.

(21) Appl. No.: 14/945,560

(22) Filed: Nov. 19, 2015

(65) Prior Publication Data

US 2017/0145899 A1    May 25, 2017

(51) Int. Cl.
*F02B 19/18*    (2006.01)
*F02F 3/28*    (2006.01)

(52) U.S. Cl.
CPC .............. *F02B 19/18* (2013.01); *F02F 3/285* (2013.01)

(58) Field of Classification Search
CPC .............. F02B 19/18; F02F 3/28; F02F 3/285
See application file for complete search history.

(56) References Cited

U.S. PATENT DOCUMENTS

| | | |
|---|---|---|
| 4,930,473 A | 6/1990 | Dietrich |
| 7,438,043 B2 | 10/2008 | Shiraishi et al. |
| 7,798,118 B2 | 9/2010 | Gagliano et al. |
| 8,499,735 B2 * | 8/2013 | Eismark ............... F02B 23/0651 123/193.4 |
| 8,662,053 B2 | 3/2014 | LaPointe et al. |
| 8,967,129 B2 * | 3/2015 | Mueller ..................... F02B 3/00 123/193.4 |
| 9,004,042 B2 | 4/2015 | Tozzi et al. |
| 2010/0326400 A1 | 12/2010 | Hayes, Jr. |
| 2012/0186555 A1 | 7/2012 | Mueller |

FOREIGN PATENT DOCUMENTS

| | | |
|---|---|---|
| JP | 0826770 A | 1/1996 |
| KR | 10-2009-0108521 A | 10/2009 |
| WO | 9634189 A1 | 10/1996 |
| WO | 2013007863 A2 | 1/2013 |

* cited by examiner

*Primary Examiner* — Hieu T Vo (57) ABSTRACT

The disclosure describes multipoint ignition systems for an engine and methods of operation of the same. The systems and methods can include an engine, including an engine block having at least one cylinder bore, a piston having a piston crown facing a flame deck surface such that a combustion main chamber is defined within a cylinder bore and located between the piston crown and the flame deck surface, the piston crown further including a piston bowl having a generally concave shape, and a combustion prechamber having a nozzle tip disposed in fluid communication with the combustion main chamber, the nozzle tip having at least one nozzle opening configured to inject a fuel jet into the combustion main chamber, wherein the piston includes a piston wall located around a circumference of the piston bowl, the piston wall including at least one cavity.

6 Claims, 8 Drawing Sheets

MULTIPOINT IGNITION SYSTEMS AND METHODS

TECHNICAL FIELD

This disclosure relates generally to internal combustion engines and, more particularly, to natural gas engines.

BACKGROUND

Internal combustion engines are well known. Those employing gasoline as fuel typically employ a number of cylinders which compress a gasoline and air mixture such that upon firing of a spark plug associated with each cylinder, the compressed mixture ignites. The expanding combustion gases resulting from the ignition move a piston within the cylinder. Upon reaching an end of its travel in one direction within the cylinder, the piston reverses direction to compress another volume of the gasoline and air mixture. The resulting mechanical energy of the moving piston can and has been harnessed for use in myriad applications, foremost among which is the propulsion of vehicles.

Another type of internal combustion engines uses natural gas as the fuel source. For example, it is known to provide a compressed natural gas engine wherein a piston reciprocates within a cylinder. A spark plug is positioned within a cylinder head associated with each cylinder and each respective spark plug is controlled by a timing circuit such that upon the piston reaching the end of its compression stroke, the spark plug fires to thereby ignite the compressed mixture.

In still further types of internal combustion engines, pre-chambers are employed in conjunction with natural gas engines. A pre-chamber is associated with each cylinder of the natural gas engine and is provided with a spark plug to initiate combustion within the pre-chamber which can then be communicated to the main combustion chamber.

Some engines may have differently shaped pistons to enhance combustion. One example of such a combustion system is disclosed in U.S. Pat. Pub. No. 2010/0326400 to Hayes Jr. The system in U.S. Pat. Pub. No. 2010/0326400 includes a combustion system with a pre-chamber adapted to cooperate with a piston in a manner that produces a highly efficient combustion process. The pre-chamber has passages that have a variable cross-section and a variable angular orientation with respect to a centerline of the pre-chamber body. The piston is provided with a number of surfaces that facilitate the flow of fuel and air within the combustion chamber. In addition, the piston surfaces are generally aligned with angles of the combustion chamber such as the angle of the intake and exhaust valves. The piston also has surfaces that are adapted to cooperate with a tip of the pre-chamber.

The improvement of the design of any particular engine is often desirable, in the form of increased engine efficiency and/or reduced emissions, especially in light of increasing fuel costs and ever more strict regulations on engine emissions. Accordingly, there is a need for improved engine systems.

SUMMARY

In one aspect, the disclosure describes a multipoint ignition system for an engine. The system can include an engine, including an engine block having at least one cylinder bore, a cylinder head having a flame deck surface disposed at one end of the cylinder bore, a piston configured to reciprocate within the cylinder bore, the piston having a piston crown facing the flame deck surface such that a combustion main chamber is defined within the cylinder bore and located between the piston crown and the flame deck surface, the piston crown further including a piston bowl having a generally concave shape, and a combustion pre-chamber having a nozzle tip disposed in fluid communication with the combustion main chamber, the nozzle tip having at least one nozzle opening configured to inject a fuel jet into the combustion main chamber, wherein the piston includes a piston wall located around a circumference of the piston bowl, the piston wall including at least one cavity, the at least one cavity having an inlet in fluid communication with the piston bowl.

In another aspect, the disclosure describes a piston for use in an engine, including a body portion having a generally cylindrical shape, and configured to reciprocate within a cylinder bore of the engine, and a crown portion coupled to the body portion, the crown further including a piston bowl having a generally concave shape, wherein the piston includes a piston wall located around a circumference of the piston bowl, the piston wall including at least one cavity, the at least one cavity having an inlet in fluid communication with the piston bowl.

In yet another aspect, the disclosure describes a method for operating a combustion system, comprising the steps of reciprocating a piston within a cylinder bore of an engine, the piston having a piston crown facing a flame deck surface of a cylinder head such that a combustion main chamber is defined within the cylinder bore and located between the piston crown and the flame deck surface, the piston crown further including a piston bowl having a generally concave shape, wherein the piston includes a piston wall located around a circumference of the piston bowl, the piston wall including at least one cavity, the at least one cavity having an inlet in fluid communication with the piston bowl, injecting a fuel jet from a nozzle tip of a combustion pre-chamber along a fuel jet centerline into the combustion main chamber, and directing the fuel jet at least partially into the at least one cavity.

Further and alternative aspects and features of the disclosed principles will be appreciated from the following detailed description and the accompanying drawings. As will be appreciated, the gaseous fuel systems, multipoint ignition gas engine systems, and methods disclosed herein are capable of being carried out in other and different aspects, and capable of being modified in various respects. Accordingly, it is to be understood that both the foregoing general description and the following detailed description are exemplary and explanatory only and do not restrict the scope of the appended claims.

DETAILED DESCRIPTION

The present disclosure can be understood more readily by reference to the following detailed description of the disclosure and the examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

Each of the materials disclosed herein are either commercially available and/or the methods for the production thereof are known to those of skill in the art. It is understood that the compositions disclosed herein have certain functions. Disclosed herein are certain structural parameters for performing the disclosed functions and it is understood that there are a variety of structures that can perform the same function that are related to the disclosed structures, and that these structures will typically achieve the same result.

Natural gas engines such as large bore lean burn engines can have unstable combustion issues such as a misfire when the fuel is burned with an excess of air or when the brake mean effective pressure (BMEP) is increased. More complete ignition of the fuel in the combustion chamber may be desired in order to improve combustion stability, speed, efficiency, and reduce emissions.

An exemplary aspect of the disclosure provides a multipoint distributed ignition system that may enhance the combustion plumes or torches coming out of a single pre-chamber or multi-torch spark plug into multiple distributed sources of combustion through smaller chambers located in the piston head towards a cylinder wall. These multiple sources or points of combustion can initiate new combustion plumes that can travel from at or near the cylinder wall towards the center of the cylinder as well as other directions to provide a more complete combustion. Such a combustion system can improve the speed, stability, and efficiency of the combustion while reducing unburned hydrocarbon (UHC) and nitrogen oxides (NOx).

Now referring to the drawings, wherein like reference numbers refer to like elements, there are illustrated systems and methods for operating a combustion system. Any numerical values recited herein are by way of illustration only. In other aspects, other values may be used, and the values can be varied in any fashion as appropriate to the application.

Figure 1:
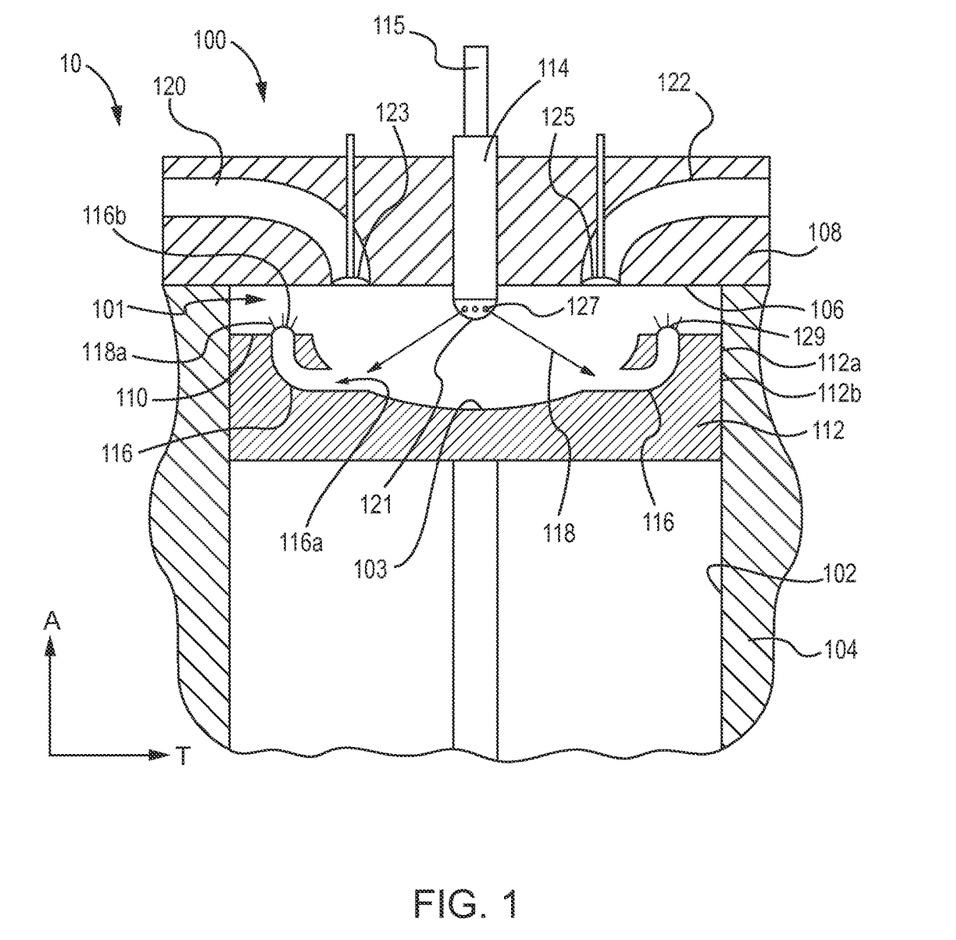
FIG. 1 illustrates a cross section of an engine combustion chamber in accordance with an aspect of the disclosure.

FIG. 1 illustrates a cross section of an engine combustion chamber in accordance with an aspect of the disclosure. As seen in FIG. 1, the combustion system 100 of the engine 10 can include an engine block 104 with at least one cylinder bore 102. The combustion system 100 may be also referred to as a multipoint ignition system. In an aspect, the combustion main chamber 101 of the combustion system 100 can have a generally cylindrical shape that is defined within a cylinder bore 102 formed within a crankcase or engine block 104. A cylinder head 108 may include a flame deck surface 106 disposed at one end of the cylinder bore 102. A piston 112 can be configured to reciprocate within the cylinder bore 102, where the piston 112 can have a piston crown 110 facing the flame deck surface 106 such that a combustion main chamber 101 is defined within the cylinder bore 102 between the piston crown 110 and the flame deck surface 106. The piston crown 110 may further include a piston bowl 103. In an aspect, the piston bowl 103 may have a generally concave shape. A combustion pre-chamber 114 can have a nozzle tip 121 disposed in fluid communication with the combustion main chamber 101. The nozzle tip 121 may protrude within the combustion main chamber 101 through the flame deck surface 106 and may have at least one nozzle opening 127 configured to inject a fuel jet 118 into the combustion main chamber 101. In an aspect, the combustion main chamber 101 can be further defined at one end by a flame deck surface 106 of a cylinder head 108, and at another end by a piston crown 110 of a piston 112 that is reciprocally disposed within the bore 102. The pre-chamber 114 can be in fluid communication with a fuel intake 115 and can be mounted in the cylinder head 108.

Figure 3:
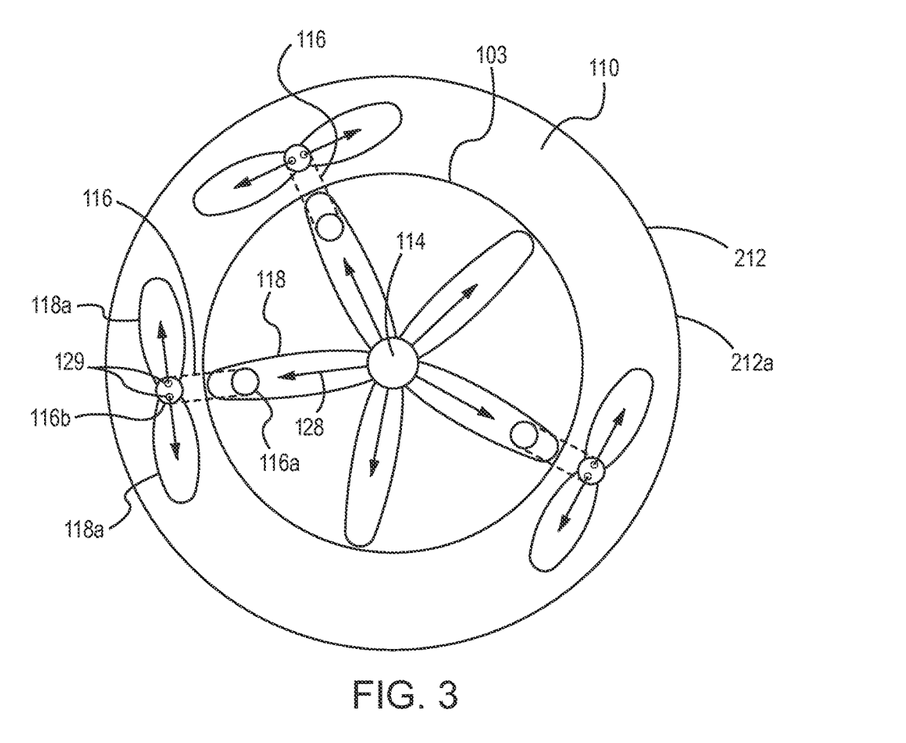
FIG. 3 illustrates a top view of an engine piston and pre-chamber in accordance with another aspect of the disclosure.

The piston 112 can include a piston wall 112a located around a circumference of the piston bowl 103, the piston wall 112a can include at least one cavity 116, where a cavity 116 can have an inlet 116a in fluid communication with the piston bowl 103. In FIG. 1, two cavities 116 are shown, but in other aspects, the piston 112 may include one or any number of cavities 116. In an aspect, the inlet 116a can be an opening between the piston bowl 103 and a cavity 116 such that a fuel jet 118 can ignite a fuel and air mixture in the cavity 116. In one aspect, each of the cavities 116 can include an outlet 116b in fluid communication with the piston bowl 103 and the combustion main chamber 101. The outlets 116b can be a single opening in an end of a cavity 116, or the outlets 116b can be a cover 129 with cavity nozzles 129a (FIG. 3). In some aspects, the covers 129 may be flat, such that the cover 129 is in the same plane as the piston crown 110, while in other aspects the covers 129 may be curved in a convex shape such that the cover 129 extends outward in a direction towards the flame deck surface 106 of the cylinder head 108. In certain aspects, a cavity 116 can have a generally circular cross section and extend in a radial direction relative to the cylinder bore 102. The cavities 116 can be located opposite from each other across the piston bowl 103. In some aspects, the inlet 116a of the cavity 116 may be substantially aligned with the nozzle opening 127, such that a centerline of the fuel jet 118 extends between the nozzle opening 127 and the inlet 116a of a cavity 116.

As shown in FIG. 1, the outlet 116b may be located on the piston crown 110 or top surface of the piston 112. In another aspect, a cavity 116 can extend in a radial direction relative to the cylinder bore 102 through the piston wall 112a such that the outlet 116b may be located on an exterior surface 112b of the piston 112. The outlet 116b may have a cavity tip or cover 129 that includes a plurality of cavity nozzles 129b. The cavity nozzles 129b can extend in any direction to direct fuel jets from the cavity 116 into the combustion main chamber 101. In the aspect shown in FIG. 1, the cavity 116 is curved between the inlet and the outlet. In another aspect, the cavity 116 can be straight between the inlet and the outlet. The diameter of a cavity 116 may be constant between the inlet 116a and the outlet 116b. In other aspects, a cavity 116 may have a variable diameter, for example, the diameter of the inlet 116a may be either greater than the diameter of the outlet 116b. In another aspect, the diameter of the inlet 116a may be less than the diameter of the outlet 116b. In some aspects, a cross-sectional shape of a cavity 116 may be constant between the inlet 116a and the outlet 116b. In other aspects, a cross-sectional shape of a one cavity 116 can be varied between the inlet 116a and the outlet 116b.

During operation of the engine 10, air can be admitted into the combustion main chamber 101 via an inlet passage 120 when one or more intake valves 123 (one shown) are open during an intake stroke. The inlet passage 120 can provide an air and fuel mixture to the combustion main chamber 101. A fuel and air mixture in the combustion pre-chamber 114 can be ignited by a spark plug or other ignition device (not shown) in the pre-chamber 114. When ignited, fuel is sprayed through nozzle openings 127 in the tip 121. Each nozzle opening 127 can create a fuel jet 118 that generally disperses and ignites the fuel and air mixture in the combustion main chamber 101. The fuel jets 118 can also ignite the fuel and air mixture in the cavities 116, causing fuel jets 118a (FIGS. 3 and 4) to disperse and further ignite the fuel and air mixture in the combustion main chamber 101. This can provide for a more complete combustion in the combustion main chamber 101 than if cavities 116 were not included, as more fuel jets 118 are included and extend in multiple directions in the combustion main chamber 101. Following combustion, exhaust gas can be expelled from the combustion chamber through an exhaust conduit 122 when one or more exhaust valves 125 (one shown) is/are open during an exhaust stroke.

Figure 2:
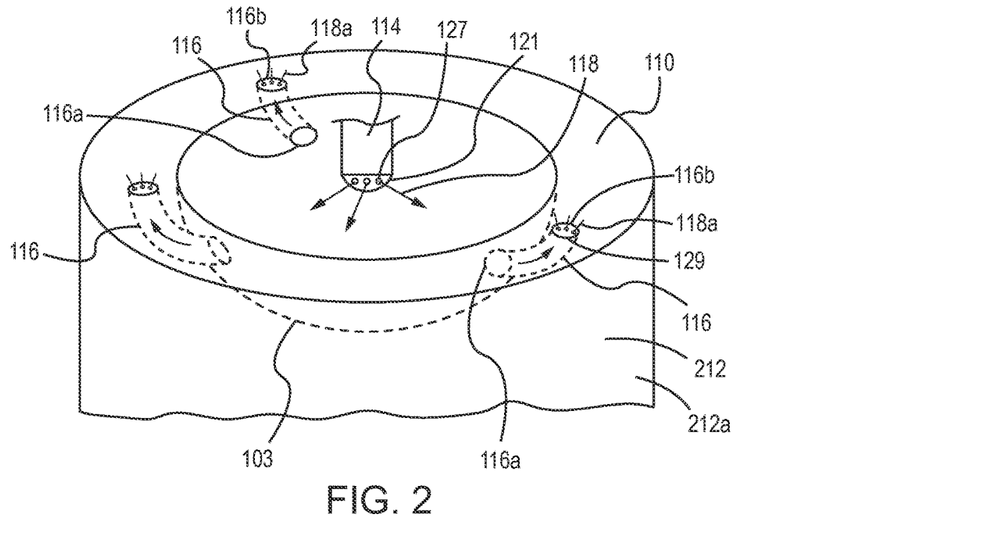
FIG. 2 illustrates a top isometric view of an engine piston and pre-chamber in accordance with another aspect of the disclosure.
Figure 4:
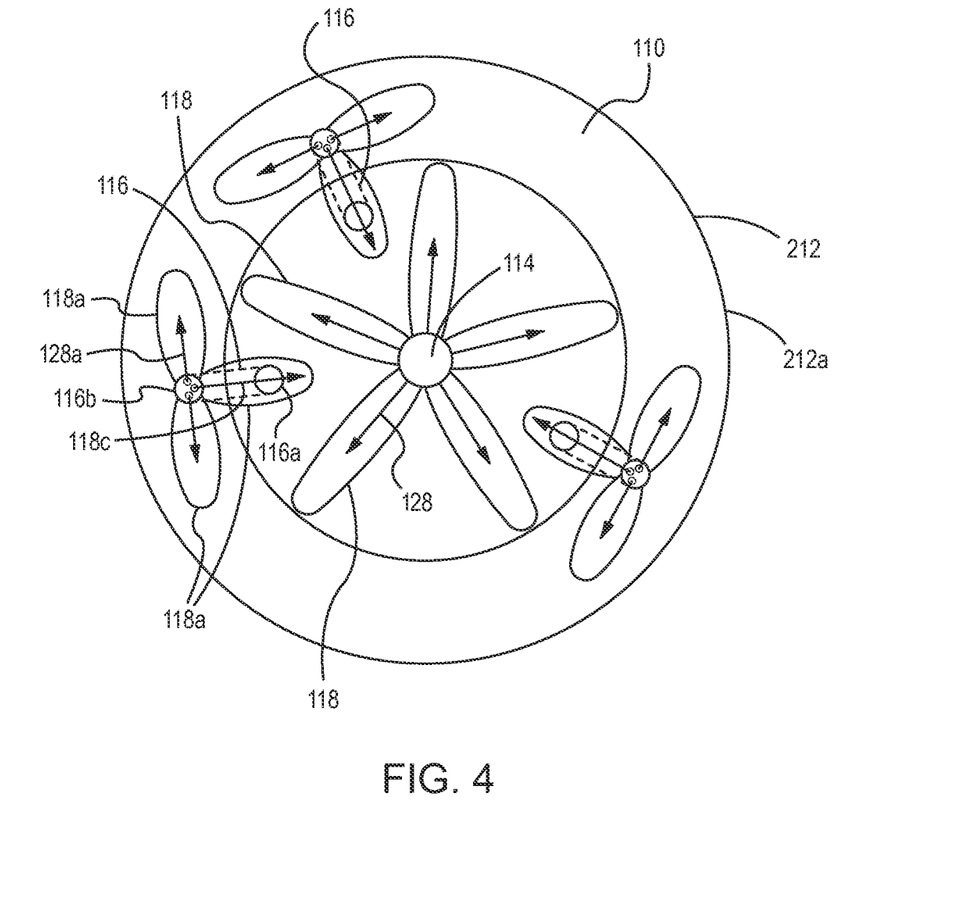
FIG. 4 illustrates a top view of an engine piston and pre-chamber in accordance with another aspect of the disclosure.

Referring now to FIGS. 2-4, the piston 212 can include a piston wall 212a located around a circumference of the piston bowl 103, the piston wall 212a can include at least one cavity 116, where a cavity 116 can have an inlet 116a in fluid communication with the piston bowl 103. In FIG. 2, three cavities 116 are shown, where the cavities 116 are radially spaced apart an equal distance from each other around the piston bowl 103. In other aspects, the piston 212 may include one or any number of cavities 116. In an aspect, the inlet 116a can be an opening between the piston bowl 103 and a cavity 116 such that a fuel jet 118 can ignite a fuel and air mixture in the cavity 116. A cavity 116 can further include an outlet 116b in fluid communication with the piston bowl 103 and the combustion main chamber 101. In certain aspects, the inlets 116a of the cavities 116 may be substantially aligned with the nozzle openings 127, such that centerlines of the fuel jet 118 extends between the nozzle opening 127 towards the inlets 116a of the cavities 116. In some aspects, a cavity 116 can have a generally tubular shape and extend in a direction towards the piston wall 212a.

Figure 5:
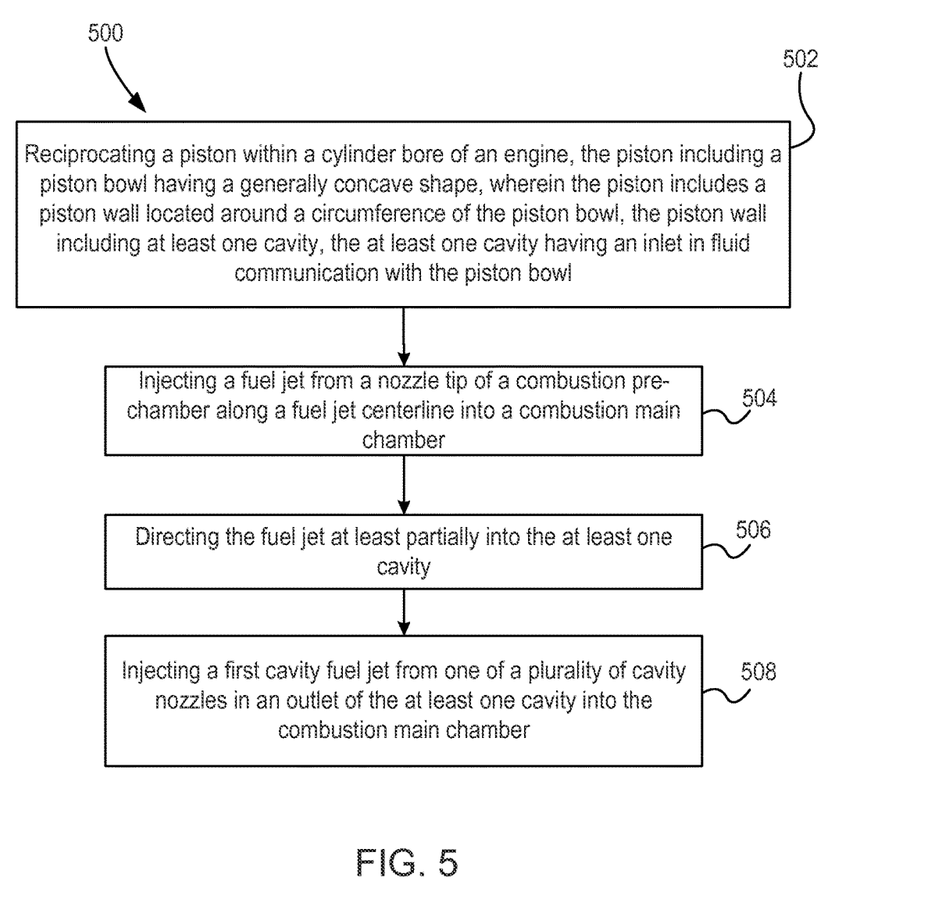
FIG. 5 is a flow chart illustrating steps of a method for operating a combustion system according to principles of the present disclosure.

In certain aspects, a nozzle opening 127 is configured to inject the fuel jet 118 along a fuel jet centerline 128. As seen in FIG. 3, the cavity nozzles 129a may be configured to send a first cavity fuel jet 118a in a direction substantially perpendicular to the centerline 128 of the pre-chamber fuel jet 118, and a second cavity fuel jet 118b in a direction substantially perpendicular to the centerline 128 of the pre-chamber fuel jet 118 on an opposite side of the outlet 116b from the first cavity fuel jet 118a. In another aspect, the cavity nozzles 129a may be configured to send another cavity fuel jet 118c (FIG. 4) in a direction substantially perpendicular to a centerline 128a of the first cavity fuel jet 118a towards the pre-chamber 114. In some aspects, as seen in FIG. 4, for example, the fuel jets 118 may be directed to locations other than the inlets 116a, such as in between the cavities 116. In other aspects, some fuel jets 118 may be directed to the inlets 116a and other fuel jets 118 may be direct to locations other than the inlets 116a, as seen in FIG. 3. FIG. 5 is a flow chart illustrating steps of a method for operating a combustion system 100, discussed in further detail in the Industrial Applicability section below.

Figure 6:
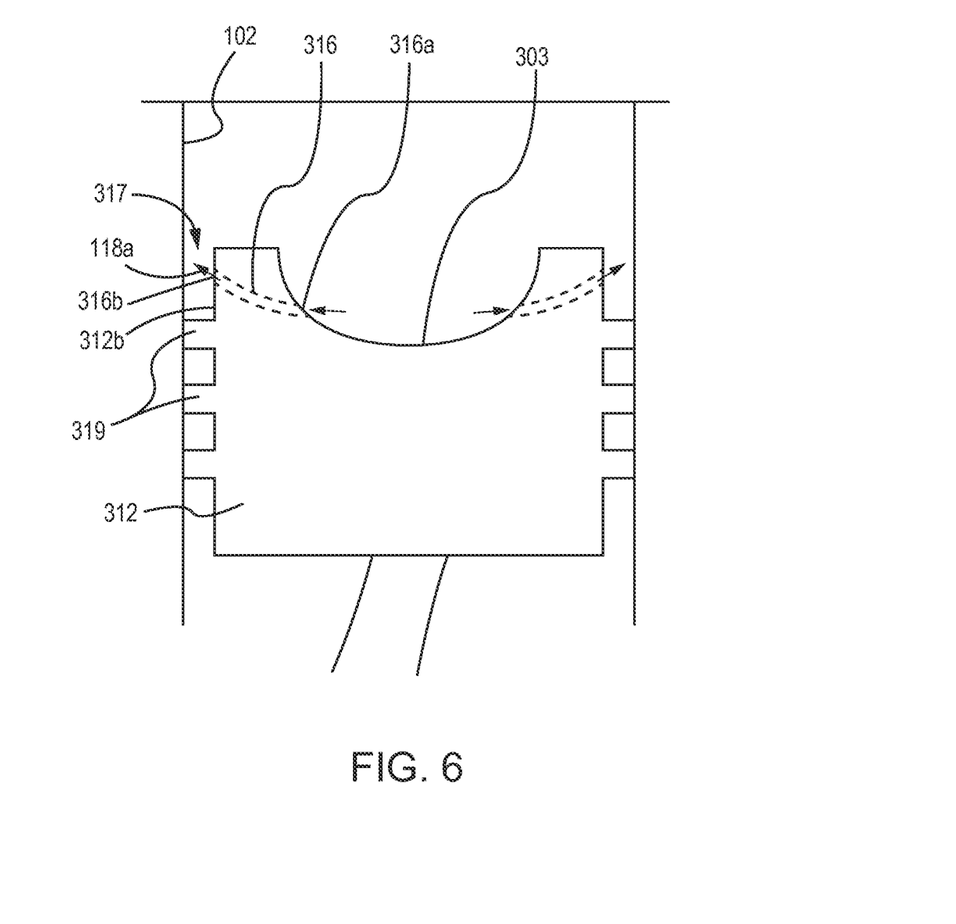
FIG. 6 illustrates a cross section of an engine piston in accordance with another aspect of the disclosure.
Figure 7:
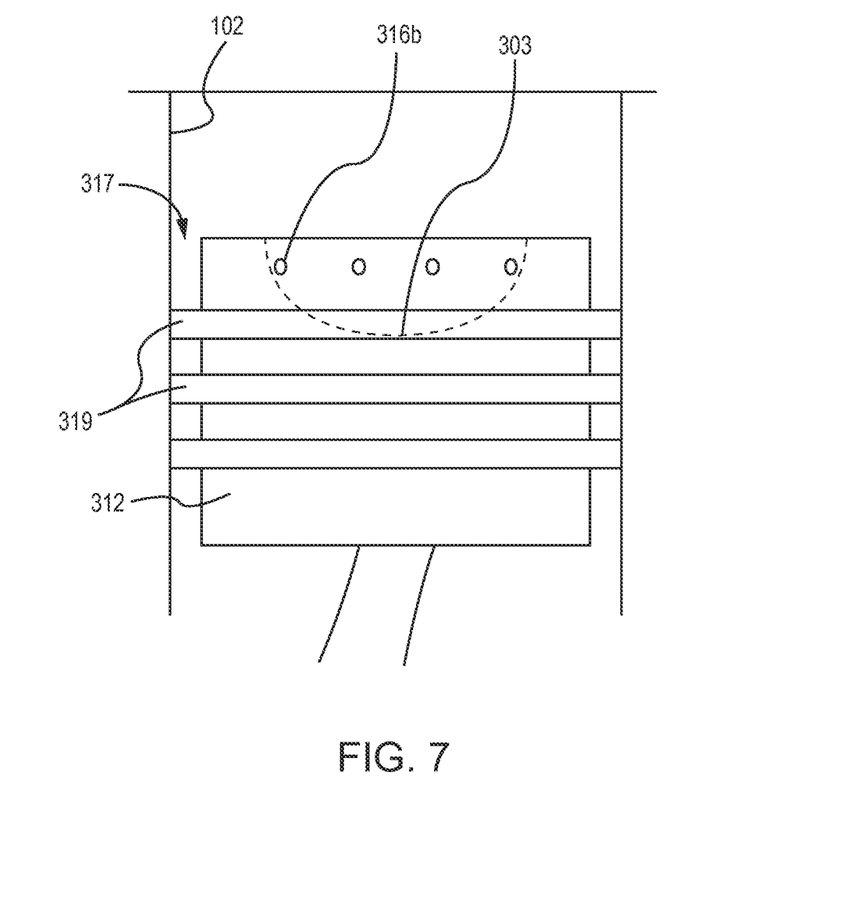
FIG. 7 illustrates a cross section of an engine piston in accordance with another aspect of the disclosure.
Figure 8:
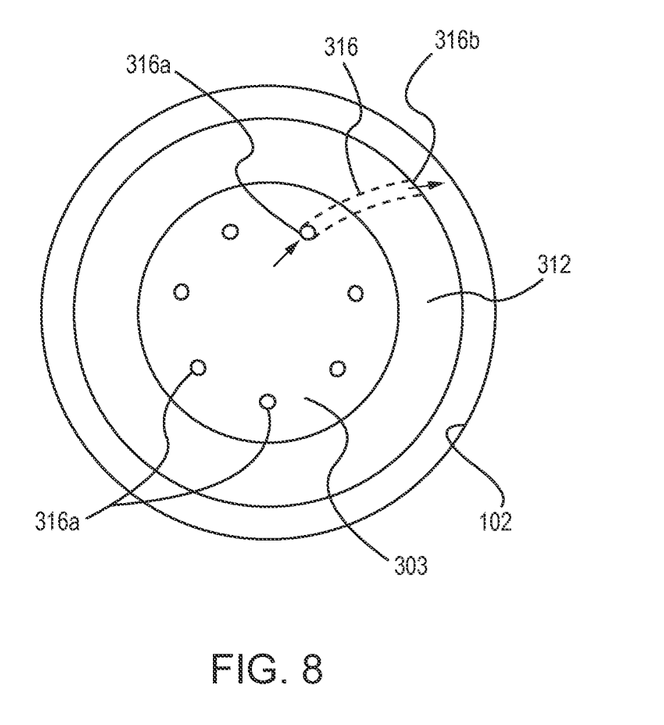
FIG. 8 illustrates a top isometric view of an engine piston in accordance with another aspect of the disclosure.

Referring now to FIGS. 6-8, an alternative aspect of an engine combustion chamber is shown. The piston 312 is similar to the piston 112 described above, except that the piston 312 can include a cavity 316, the cavity 316 including an inlet 316a located in the piston bowl 303, and an outlet 316b located on an exterior surface 312b of the piston 312. The cavity 316 can extend in a radial direction relative to the cylinder bore 102 through the piston wall 312a such that the outlet 316b may be located on an exterior surface 312b of the piston 312, such that the outlet 316b is configured to eject a fuel jet 118a into a gap 317 between the piston wall 312a and the cylinder bore 102. In some aspects, piston rings 319 may be formed around a circumference on the exterior surface 312b of the piston 312 such that the gap 317 is formed between the exterior surface 312b of the piston 312 and the cylinder bore 102, such that a fuel jet 118a can ignite a fuel and air mixture in the gap 317 to ensure a more complete combustion of the fuel and air mixture in the cylinder bore 102.

INDUSTRIAL APPLICABILITY

Aspects of a combustion system for an engine using a gaseous fuel and a method for operating a combustion system are described herein. The industrial applicability of aspects constructed according to principles of the present disclosure will be readily appreciated from the foregoing discussion. The described principles are applicable for use in multiple aspects of an engine and have applicability in many machines which include an engine.

The disclosed systems and method of operating a combustion system may be applicable to any application of an engine containing cylinders. The system and method of operating a combustion system of this disclosure may be used in a stand-alone engine, for example, or in an engine that may be coupled to a machine (not shown). In some aspects, the machine can be an "over-the-road" vehicle such as a truck or may be any other type of machine that performs some type of operation associated with an industry such as mining, construction, farming, transportation, or any other industry known in the art. For example, the machine may be an off-highway truck, earth-moving machine, such as a dump truck, excavator, front loader, or the like.

FIG. 5 is a flow chart illustrating steps of a method for operating a combustion system according to principles of the present disclosure. In certain aspects, the method 500 shown in FIG. 5 for operating a combustion system 100 can include the step 502 of reciprocating or moving a piston 112 within a cylinder bore 102 of an engine 10. The piston 112 can include a piston crown 110 facing a flame deck surface 106 of a cylinder head 108 such that a combustion main chamber 101 can be defined within the cylinder bore 102 and between the piston crown 110 and the flame deck surface 106. The piston crown 110 can further include a piston bowl 103 having a generally concave shape, wherein the piston 112 includes a piston wall 112a located around a circumference of the piston bowl 103. The piston wall 112a can include at least one cavity 116, where the at least one cavity 116 can have an inlet 116a in fluid communication with the piston bowl 103. In step 504, a fuel jet 118 can be injected from a nozzle tip 121 of a combustion pre-chamber 114 along a fuel jet centerline 128 into the combustion main chamber 101. The fuel jet 118 can be directed at least partially into the at least one cavity 116 in step 506, where the at least one cavity 116 can have a generally circular cross section. The method 500 can further include the step 508 of injecting a first cavity fuel jet 118a from one of a plurality of cavity nozzles 129a in an outlet 116b of the at least one cavity 116 in a direction substantially perpendicular to a centerline 128 of a pre-chamber fuel jet 118 into the combustion main chamber 101.

The disclosed piston 112 may be manufactured using conventional techniques such as, for example, casting or molding. Alternatively, the disclosed piston 112 may be manufactured using conventional techniques generally referred to as additive manufacturing or additive fabrication. Known additive manufacturing/fabrication processes include techniques such as, for example, 3D printing. 3D printing is a process wherein material may be deposited in successive layers under the control of a computer. The computer controls additive fabrication equipment to deposit the successive layers according to a three-dimensional model (e.g. a digital file such as an AMF or STL file) that is configured to be converted into a plurality of slices, for example substantially two-dimensional slices, that each define a cross-sectional layer of the piston 112 in order to manufacture, or fabricate, the piston 112. In one case, the disclosed piston 112 would be an original component and the 3D printing process would be utilized to manufacture the piston 112. In other cases, the 3D process could be used to replicate an existing piston 112 and the replicated piston 112 could be sold as aftermarket parts. These replicated aftermarket piston 112 could be either exact copies of the original piston 112 or pseudo copies differing in only non-critical aspects.

Figure 9:
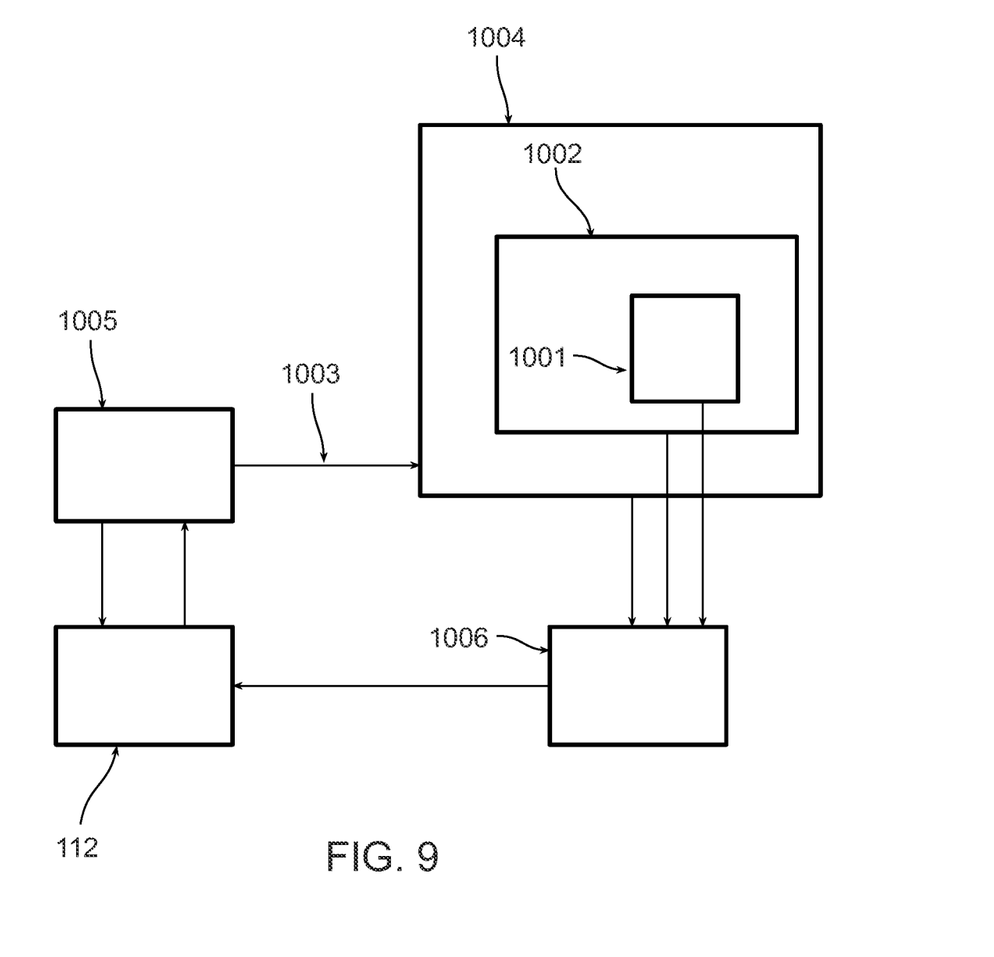
FIG. 9 is a schematic drawing representing a system for generating a three-dimensional model of a piston.

With reference to FIG. 9, the three-dimensional model 1001 used to represent an original piston 112 may be on a computer-readable storage medium 1002 such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. This storage medium may be used in connection with commercially available 3D printers 1006 to manufacture, or fabricate, the piston 112. Alternatively, the three-dimensional model may be transmitted electronically to the 3D printer 1006 in a streaming fashion without being permanently stored at the location of the 3D printer 1006. In either case, the three-dimensional model constitutes a digital representation of the piston 112 suitable for use in manufacturing the piston 112.

The three-dimensional model may be formed in a number of known ways. In general, the three-dimensional model is created by inputting data 1003 representing the piston 112 to a computer or a processor 1004 such as a cloud-based software operating system. The data may then be used as a three-dimensional model representing the physical piston 112. The three-dimensional model is intended to be suitable for the purposes of manufacturing the piston 112. In an exemplary embodiment, the three-dimensional model is suitable for the purpose of manufacturing the piston 112 by an additive manufacturing technique.

In one embodiment depicted in FIG. 9, the inputting of data may be achieved with a 3D scanner 1005. The method may involve contacting the piston 112 via a contacting and data receiving device and receiving data from the contacting in order to generate the three-dimensional model. For example, 3D scanner 1005 may be a contact-type scanner. The scanned data may be imported into a 3D modeling software program to prepare a digital data set. In one embodiment, the contacting may occur via direct physical contact using a coordinate measuring machine that measures the physical structure of the piston 112 by contacting a probe with the surfaces of the piston 112 in order to generate a three-dimensional model. In other embodiments, the 3D scanner 1005 may be a non-contact type scanner and the method may include directing projected energy (e.g. light or ultrasonic) onto the piston 112 to be replicated and receiving the reflected energy. From this reflected energy, a computer would generate a computer-readable three-dimensional model for use in manufacturing the piston 112. In various embodiments, multiple 2D images can be used to create a three-dimensional model. For example, 2D slices of a 3D object can be combined to create the three-dimensional model. In lieu of a 3D scanner, the inputting of data may be done using computer-aided design (CAD) software. In this case, the three-dimensional model may be formed by generating a virtual 3D model of the disclosed piston 112 using the CAD software. A three-dimensional model would be generated from the CAD virtual 3D model in order to manufacture the piston 112.

The additive manufacturing process utilized to create the disclosed piston 112 may involve materials such as plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes. It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more examples thereof) may be used in combination with each other. Other examples can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as aspects or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

I claim:

1. A piston for use in an engine, comprising:
    a body portion having a generally cylindrical shape, and the body portion configured to reciprocate within a cylinder bore of the engine; and
    a crown portion coupled to the body portion, the crown portion further including a piston bowl having a generally concave shape;
    wherein the piston includes a piston wall located around a circumference of the piston bowl, the piston wall including at least one cavity, the at least one cavity having an inlet in fluid communication with the piston bowl.

2. The piston of claim 1, wherein the at least one cavity includes an outlet in fluid communication with a combustion main chamber of the cylinder bore and located on a top surface of the piston, wherein the at least one cavity comprises a generally circular cross section and extends in a radial direction relative to the cylinder bore.

3. The piston of claim 2, wherein a diameter of the at least one cavity is constant between the inlet and the outlet, and wherein the outlet of the at least one cavity has a plurality of cavity nozzles.

4. A piston for use in an engine, comprising:
    a body portion having a generally cylindrical shape, the body portion configured to reciprocate within a cylinder bore of the engine; and
    a crown portion coupled to the body portion, the crown portion further including a piston bowl having a generally concave shape;
wherein the piston includes a piston wall located around a circumference of the piston bowl, the piston wall including at least one cavity, the at least one cavity having an inlet in fluid communication with the piston bowl;
    wherein the at least one cavity includes an outlet in fluid communication with a combustion main chamber of the cylinder bore and located on a top surface of the piston.

5. The piston of claim 4, wherein the at least one cavity comprises a generally circular cross section and extends in a radial direction relative to the cylinder bore.

6. The piston of claim 5, wherein a diameter of the at least one cavity is constant between the inlet and the outlet, and wherein the outlet of the at least one cavity has a plurality of cavity nozzles.

* * * * *